United States Patent [19]
Graham

[11] Patent Number: 5,596,801
[45] Date of Patent: Jan. 28, 1997

[54] BAILING ASSEMBLY FOR PLASTIC HANDLE APPLICATION

[75] Inventor: Brian Graham, Lodi, Ohio

[73] Assignee: Cardinal Packaging, Inc., Streetsboro, Ohio

[21] Appl. No.: 118,009

[22] Filed: Sep. 8, 1993

[51] Int. Cl.$^6$ .................................................. B23P 19/04
[52] U.S. Cl. ........................... 29/774; 29/235; 29/281.4
[58] Field of Search .............................. 29/774, 453, 438, 29/281.1, 281.4, 235

[56] References Cited

U.S. PATENT DOCUMENTS

| | | | |
|---|---|---|---|
| 1,280,411 | 10/1918 | Craig | 29/774 X |
| 2,537,922 | 1/1951 | Strasser | 29/774 X |
| 2,623,274 | 12/1952 | Henchert | 29/774 X |
| 3,462,823 | 8/1969 | Heisler | 29/774 X |
| 3,524,241 | 8/1970 | Walkup et al. | 29/774 |
| 3,626,879 | 12/1971 | Heiseir | 29/774 |
| 3,818,572 | 6/1974 | Burrell | 29/774 |

Primary Examiner—Peter Vo
Assistant Examiner—Khan V. Nguyen
Attorney, Agent, or Firm—Fay, Sharpe, Beall, Fagan, Minnich & McKee

[57] ABSTRACT

An apparatus and method for attaching inconsistent length plastic handles to a container. The apparatus comprises a mandrel having a bottom diameter less than that of the container and a top diameter greater than that of the container. The container rests on the mandrel until uneven forces are applied by attachment of a handle having unequal length sides, at which time the shorter arm of the handle engages the container first, causing the corresponding sides of the container to slide upwardly on the mandrel and the opposite side to slide downwardly. The downward sliding places the corresponding receptacle closer to the longer arm of the handle facilitating engagement. A die having a body and an arcuate shaped handle forming area adjacent a recess in the body delivers the handle to the container. The recess also includes end portions tapered in the direction of the arcuate bend of the handle forming area.

10 Claims, 6 Drawing Sheets

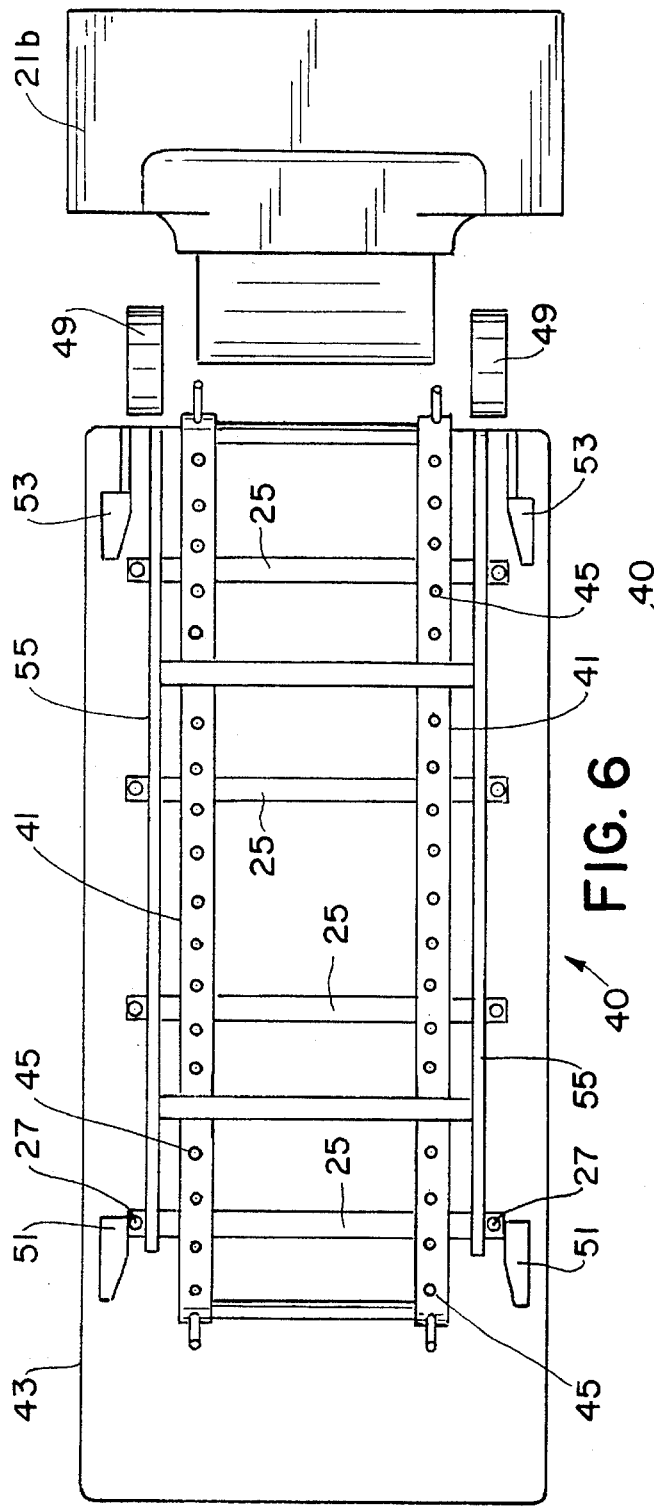
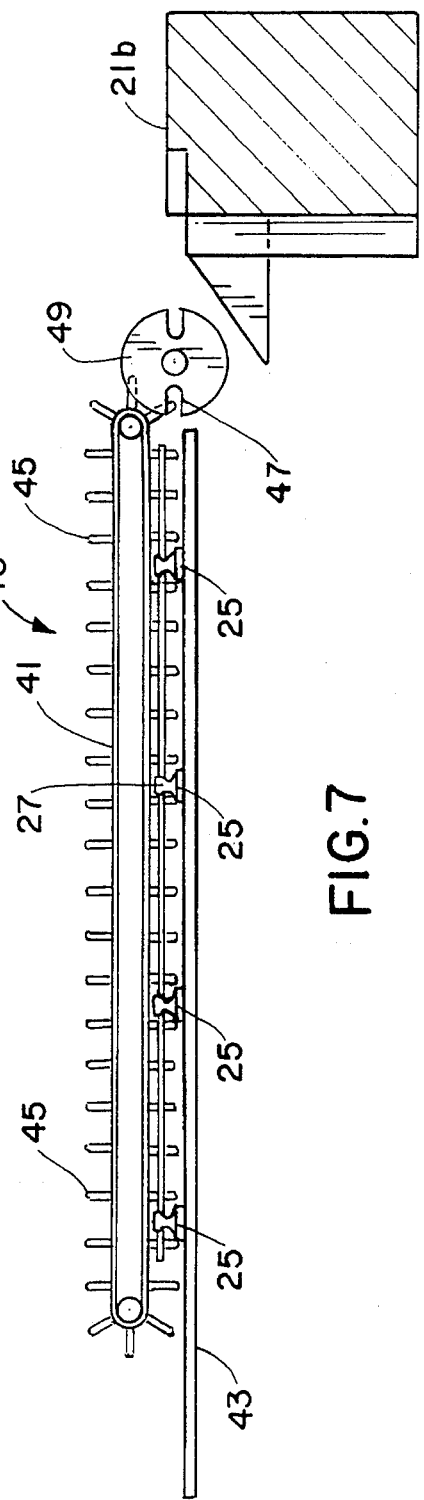
FIG. 6
FIG. 7

BAILING ASSEMBLY FOR PLASTIC HANDLE APPLICATION

BACKGROUND OF THE INVENTION

1. Field of the Invention

This invention relates to an apparatus for attaching handles to containers. Particularly, this invention relates to an apparatus for attaching plastic handles to plastic containers. More particularly, this invention relates to an apparatus for attaching inconsistently sized and shaped plastic handles to plastic containers.

The invention is particularly applicable to plastic pails having plastic handles which are subjected to loads or forces below freezing temperatures, and will be described with particular reference thereto. However, it will be appreciated that the invention is broader and more general in application, and may be advantageously employed with other containers.

2. Description of The Art

An injection molded plastic container of the type generally used to package food products, is a one-piece or unitary cylindrical container. Usually, a container is formed such that it is closed at the bottom end with a tapered circumferentially continuous sidewall chamber extending from the closed bottom end to an upper open end. The upper end of each container includes a lip and a rim that lockingly cooperate with a separately formed closure member or lid. The lid, likewise, includes a lip portion adapted to snap fit and securely lock over the rim to close the container.

Also provided adjacent the upper edge of each container are a pair of bail ears to engage a bail or handle. Preferably, the bail ears are integrally molded of the same plastic as the remainder of the container, for example, recyclable high density polyethylene. The bail ears extend radially outward from the container sidewall and are disposed diametrically opposite one another to provide balance when the container is carried by the bail. Each ear may include a mounting face spaced outwardly from the remainder of the container sidewall, having an aperture extending therethrough adapted to receive opposed ends of the bail. Often, commercially available containers use a bail formed from metal wire stock.

Although containers of this general type have met with commercial success, the metal bail, although still the most commonly used type of bail, is not preferred for all situations. There are some problems associated with its use. For example, there is potential for puncturing the plastic container, particularly when the container is exposed to sub-freezing temperatures. During the packaging and distribution process at subfreezing temperatures, plastic has a greater chance of breaking because it is brittle at low temperatures. If impact occurs, the metal handle may be driven through the brittle plastic and may break away a piece of the plastic into the contents of the package. In the case of food products, the risk of a plastic piece being dislodged into the food product is undesirable. This problem is generally known in the industry as "coining".

Another problem associated with a metal bail is a potential for interference with a metal detector installed in a food-processing plant used to monitor the contents of the food product in a container. The metal detector determines the presence of undesirable metal, inadvertently intermixed with the food product. As is apparent, the metal bail could falsely trigger the metal detector. Accordingly, the use of a plastic handle to provide a completely plastic container is desirable.

Another area of increasing concern is the ability to recycle containers. As with so many other products, the limited space remaining in landfills has brought an increased focus on the ability to recycle. Although the plastic container is itself recyclable, and metal bails are recyclable, combined plastic and metal products are undesirable since it is considered a commingled product. Additional handling and expense must be encountered at the recycling facility to separate different material components. Accordingly, recycling demands also make a plastic handle preferable.

Details of a preferred completely plastic container and handle may be found in commonly assigned U.S. Pat. Nos. 4,997,098, and U.S. Ser. No. 911,517 filed Jul. 10, 1992. The disclosure of each is hereby incorporated by reference.

U.S. Ser. No. 911,517 describes the advantages of plastic handles and provides an acceptable plastic handle design. However, processes for making plastic handles are such that tolerances are generally quite broad. This occurs primarily due to large and unpredictable shrinkage in molded polyethylene. There is often a variation in length from one handle to another of up to one half inch. Furthermore, the elevated temperature of the molding process provides ample thermal energy to the handles to allow warping or bowing after removal from the mold. Accordingly, traditional mechanisms for mounting the bail or handle are not satisfactory.

U.S. Pat. No. 3,626,879 describes a process for attaching plastic bails, wherein the bail must be cut or punched to a predetermined length to be useful. The additional step of cutting and punching molded handles is required due to their inconsistent length. Specifically, in the process described in the U.S. Pat. No. 3,626,879, a bail handle having a non-standard distance between the holes in the handle would result in misalignment of the button-like protuberances with the apertures of the bail. This may result in the failure of one end of the bail to interlock with its corresponding bail ear. If one hole and ear do interlock, tearing of either the bail or the ear receptacle may occur. Accordingly, U.S. Pat. No. 3,626,879 does not address the difficulty encountered in the attachment of bails having protuberances separated by inconsistent distances.

U.S. Pat. No. 4,236,305 shows a means for mounting a plastic handle via a resilient ring; however, it does not address the issue of inconsistent bail length.

For these reasons, molded polyethylene handles have traditionally been applied to containers by hand. Therefore, this particular art is in need of an apparatus for attaching bowed handles or handles of inconsistent lengths to a container.

SUMMARY OF THE INVENTION

Accordingly, it is a primary object of this invention to provide a new and improved apparatus for applying handles to containers.

It is a further object of this invention to provide a new and improved apparatus for applying plastic handles having inconsistent lengths and/or bowing to plastic containers.

It is still a further object of this invention to provide a new and improved apparatus that is efficient in the attachment of inconsistent length injection molded polyethylene handles having protuberances to plastic containers having bail ears.

Another object of this invention is to provide a new and improved apparatus that reduces the frequency of tears in the container bail ear receptacles and/or handles.

Additional objects and advantages of the invention will be set forth in part in the description which follows and in part will be obvious from the description or may be learned by practice of the invention. The objects and advantages of the invention may be realized and attained by means of the instrumentalities and combinations particularly pointed out in the appended claims.

To achieve the foregoing objects and in accordance with the purpose of the invention, as embodied and broadly described herein, this invention comprises an apparatus for attaching a plastic handle to a plastic container comprising a mandrel and a means for attaching the handle to the container. Preferably, the mandrel has a generally tapered body and a shape generally concentric to the shape of the container. The mandrel is smaller in diameter at its narrowest point and larger in diameter at its widest point than the container. Accordingly, the container fits matably onto the tapered body of the mandrel.

Preferably, the apparatus also includes a means for placing the container into a mated position with the body of the mandrel. More preferably, the means for placing the container on the mandrel is a pneumatic pop-up platform.

Preferably, the means for attaching the handle to the container functions while the container is in its mated position with the mandrel. More preferably, the means for attaching the handle to the container will be a moveable die assembly shaped to retain the handle and position its protuberances into alignment below the bail ears of the container. Thereafter, the die assembly and bail are lifted upward and the protuberances driven into a locked position in the bail ear receptacles.

In a preferred embodiment, the means for attaching the handle comprises a die assembly having a generally flat central portion bounded by two arcuate surfaces. A shelf having tapered terminal portions is contiguous with the generally flat central portion. The shelf generally lies in the same plane as the flat central portion and the tapered terminal portions taper in the same general direction as their respective arcuate surfaces. When a bowed handle enters the die assembly, one or both of its terminal portions may extend onto the shelf. A second die member cooperative with the arcuate surfaces then forms the handle into an arcuate shape. As the second die member forms the handle to the arcuate surfaces of the first die member, the tapered portions of the shelf urge the ends of the handle into proper position around the arcuate surfaces for attachment to the container.

Preferably, the die receives a handle from a handle feeding means. Thereafter, a gripping device cooperatively holds the handle against the flat central portion of the arcuate surface, and the die assembly forms the handle in alignment with the container on the mandrel. The die is then raised to engage the handle protuberances and container receptacles.

The container has two receptacles to accept the two protuberances of the handle. These receptacles may consist of a slot leading to a hole in the container sidewall or in an ear extended from the outer surface of the container sidewall chamber. Typically, the slot is comprised of an arcuate or inverted "V" shape converging at the hole. Accordingly, the slot guides the protuberance into the retaining hole.

The mandrel is designed to accept the open end of the container and allow the container to slide or tilt on the mandrel in response to the force of a first protuberance on the handle entering a first receptacle on the container. The container tilts upward at its side where the handle protuberance first contacts the container receptacle, coincidentally forcing the opposite side of the container lower relative to the mandrel and causing connection of the second protuberance and second receptacle. When the plastic handle is sized such that the protuberances extend equidistantly from the die, the two sides may lock simultaneously, avoiding tilting the container. However, as compared to the art, this process provides a means to reduce tearing of the container and/or handle and a means for increasing the successful mating of inconsistently sized handles.

When initially mounted on the mandrel, the vertical axis of the container is generally perpendicular to the horizontal axis of the mandrel. Upon tilting of the container as a result of forces from the handle being attached, the vertical axis of the container shifts from perpendicular to the mandrel's horizontal axis and forms an acute angle to the horizontal axis of the mandrel at the side of the container having the first contacted receptacle and forms an obtuse angle with the horizontal axis of the mandrel at the side of the second receptacle.

The means for delivering the handle to the die comprises a flat surface having two parallel guides such as rods mounted thereto. The guides cooperate with the protuberances on the handle to maintain the handle in substantial alignment. A rotating conveyor belt, comprised of flexible projections facing the flat surface and handles, causes the projections to contact the handle and slide it along the flat surface. The conveyor belt guide rods and flat surface terminate adjacent a notched disc, The disc is generally circular having diametrically opposite notches sized to accommodate a handle. A handle enters a notch and the disc is rotated 180° to present the handle to the die assembly. Coincidentally, the opposite notch receives a handle.

The current invention also includes a method for attaching a handle to a container which comprises placing the container on a mandrel, placing a handle in a die, and moving the die into a position to attach the handle to the container wherein the container will tilt on the mandrel to accept the handle. The handle is fed into a pair of dies which, when closed, cause the handle to form an arcuate shape. The pair of dies grip both the top and bottom of the midportion of the handle with the ends of the handle extending from the die pair. The ends of the handle are advanced to the container and the handle protuberances slide into the receptacles on the container. The process may also include rotation of the container to align the receptacles on the container with the protuberances on the handle being extended by the die. The container will tilt as it slides on the tapered surface of the mandrel when exposed to an uneven force from the handle.

BRIEF DESCRIPTION OF THE DRAWINGS

The invention consists in novel parts, construction, arrangements, combinations and improvements shown and described. The accompanying drawings, which are incorporated in and constitute a part of the specification, illustrate one embodiment of the invention and, together with the description, serve to explain the principles of the invention.

FIG. 6 is a top view of the feeder mechanism.

FIG. 7 is an elevational view of the feeder mechanism.

DETAILED DESCRIPTION OF THE INVENTION

Reference will now be made in detail to the present preferred embodiment of the invention, an example of which is illustrated in the accompanying drawings.

While the invention will be described in connection with a preferred embodiment, it will be understood that it is not intended to limit the invention to that embodiment. On the contrary, it is intended to cover all alternatives, modifications and equivalents as may be included within the spirit and scope of the invention defined by the appended claims.

Figure 1:
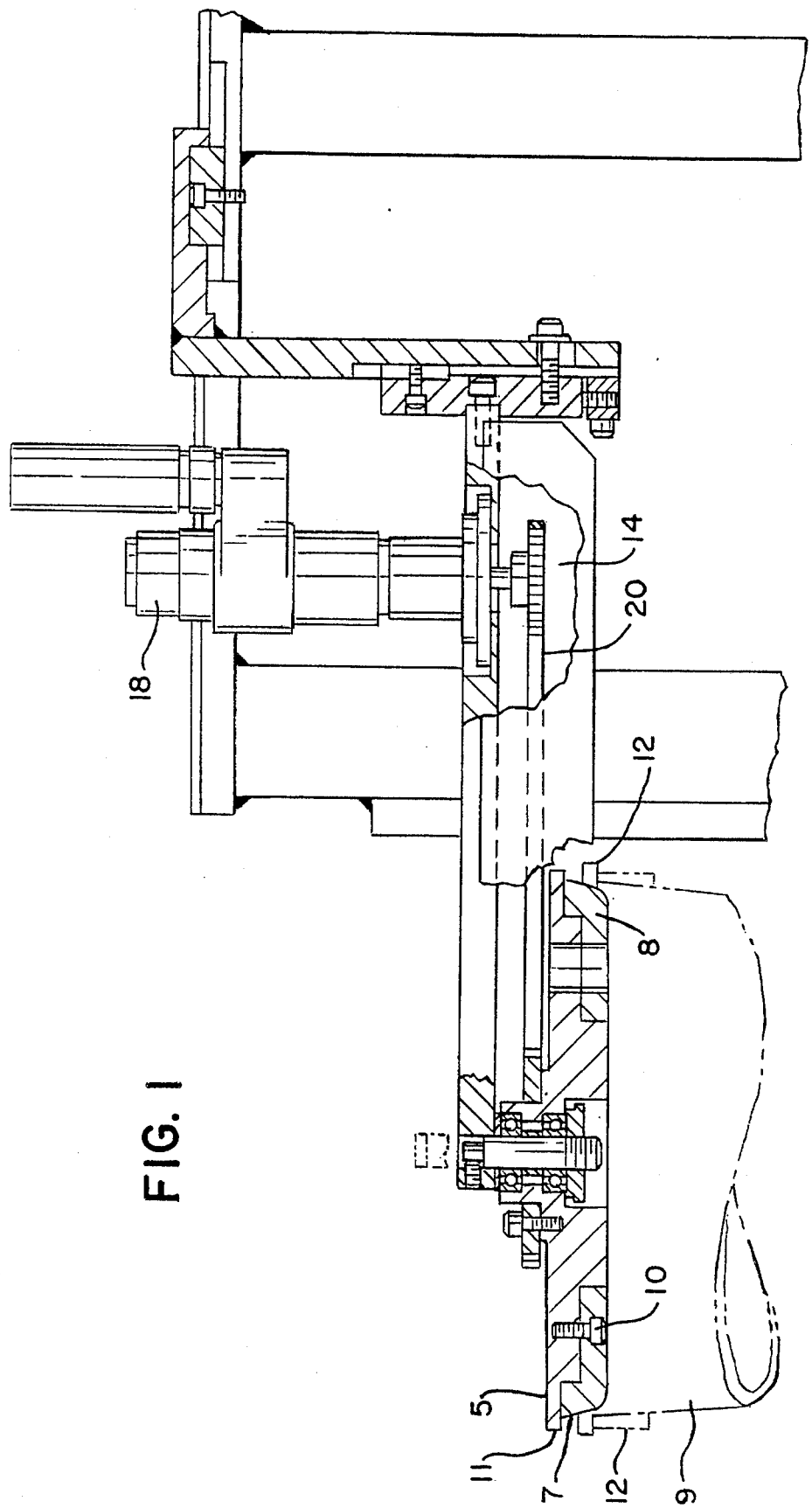
FIG. 1 is an elevational view of the mandrel assembly.

Referring now to FIG. 1, the mandrel is identified by reference numeral 5. Mandrel 5 includes tapered side wall 7. Preferably, the dimensions of mandrel 5 can be altered by replacing exterior shoulder 8. Shoulder 8 can be interchanged to provide a greater diameter mandrel, or a variety of angles to side wall 7. Screw 10 allows selective removal and replacement of shoulder member 8. Generally, mandrel 5 is shaped at its periphery, side wall 7, in accordance with the shape of container 9 with which it is intended to mate. Typically, the container and mandrel are round.

Figure 4:
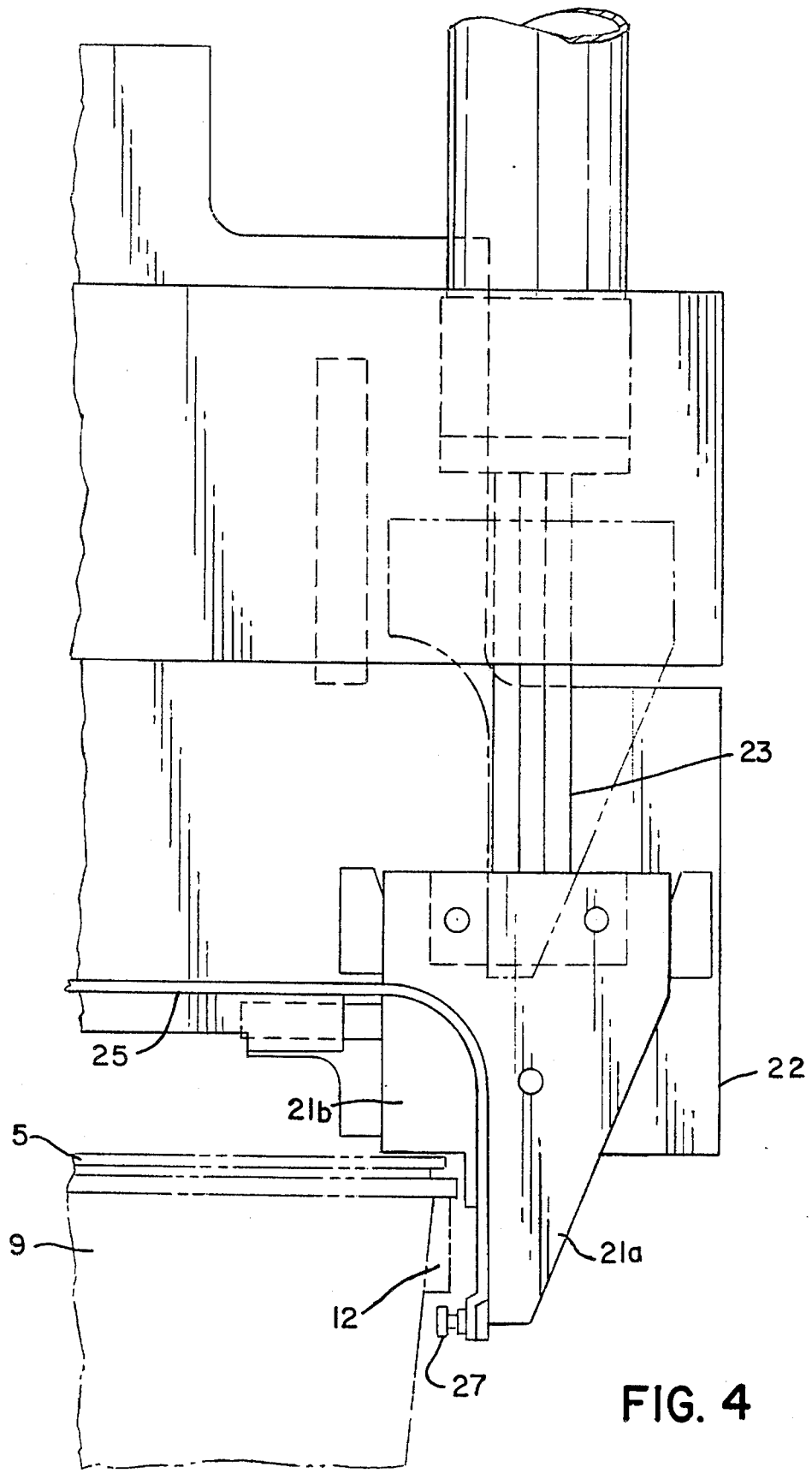
FIG. 4 is an elevational view of one handle die.

Referring now to FIGS. 1 and 4, the container slidably engages the mandrel up to the point where the diameter of the mandrel and the diameter of the container are equivalent. As can be seen in FIG. 1, this engagement point will be at an intermediate position of the wall 7 to allow tipping of the container as will hereinafter be more fully explained. Container 9 rests at this location until either of its receptacles 12 is engaged by one of the protuberances 27 of handle 25, at which time the die assembly 22 is lifted, forcing handle 25 upward and protuberance 27 into receptacle 12. Receptacle 12 generally comprises a hole sized to selectively lock together with the protuberance 27 on handle 25. A cut-out having an arcuate or "V" shape opening toward the base portion of container 9 is contiguous to the hole and acts to guide protuberance 27 upward into the hole.

When the handle extends equal distances from die assembly 22, handle 25 will engage both receptacles 12 simultaneously and the forces on the container 9 will be equal on both sides. Accordingly, container 9 will not travel significantly upward on the mandrel or tilt since there is no moment of force that would cause it to do so. However, when one end of handle 25 is extended a shorter distance from die assembly 22 than the other, the shorter end will initially engage a first receptacle 12 on the corresponding side of container 9, causing container 9 to slide upward at that side of mandrel 5 while sliding downward at the opposite side of mandrel 5. The slide results from a movement of force caused by the container only having a pulling force on one side. The container will thus tend to tilt on the mandrel about a line generally half way between the two receptacles, the pivotal points of which will be where the container engages the mandrel side wall 7. The surface of the mandrel must allow for such slippage and twist. The downward moving side will next accordingly engage the longer side of handle 25 and it too will then receive the equal pulling force of the handle so the twist will cease.

Mandrel 5 shows a preferred embodiment, having rim 11. As is apparent to one of ordinary skill in the art, rim 11 is optional as a stop means for the upward travel of one side of container 9.

An alternate embodiment of the current invention would include a mandrel which is pivotally mounted. In which case, the container can rise to a fixed level of the mandrel and be positioned there. When uneven length handles enter the container receptacles, the mandrel itself will pivot to accommodate the differences in length.

Figure 3:
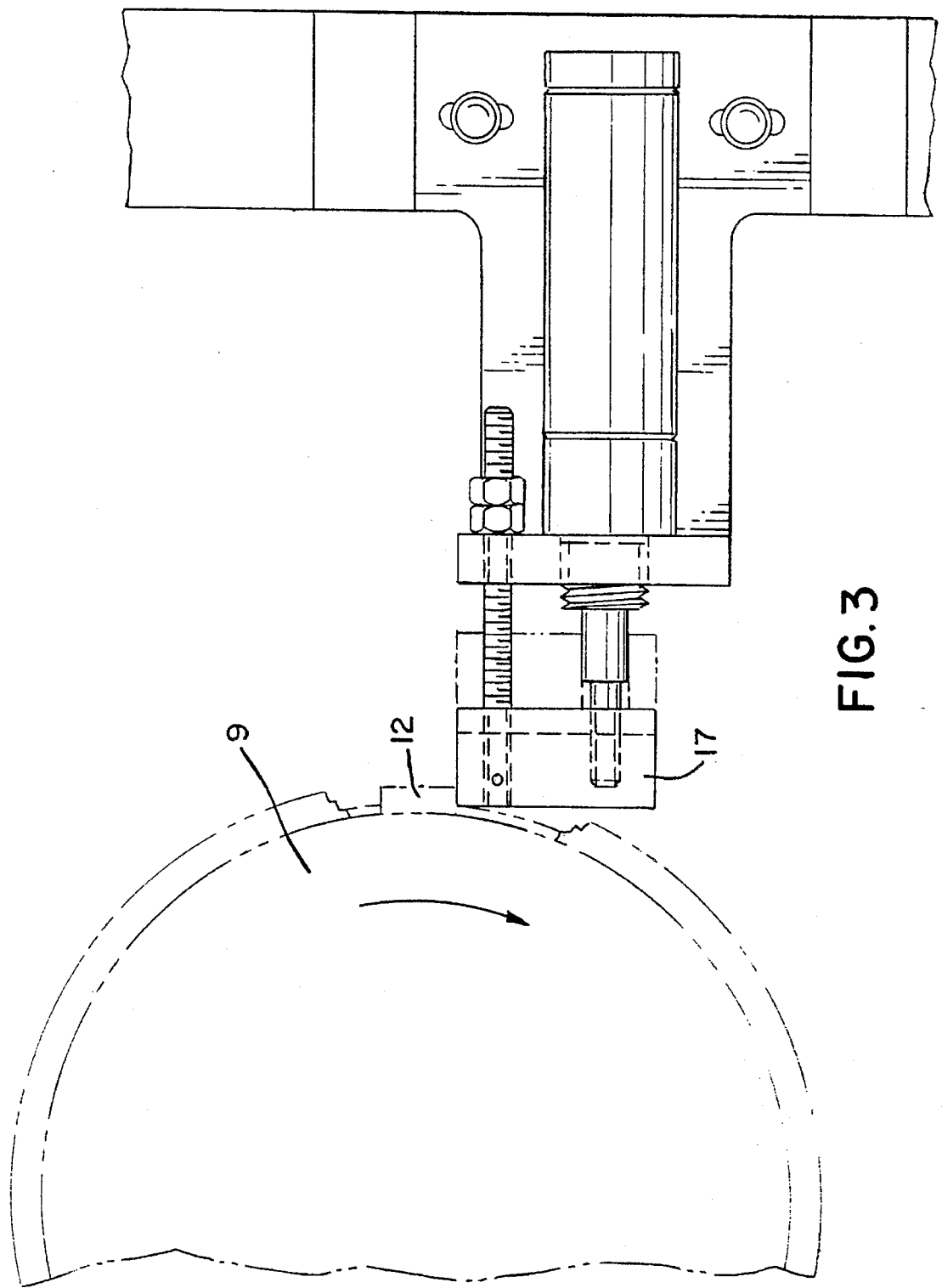
FIG. 3 is a top view of the container rotation stop.

Preferably, mandrel 5 includes a means for rotation 14 comprised of motor 18 and drive belt 20. Rotation of the mandrel with the container mated thereto results in rotation of the container. Pneumatically driven stop means 17, shown in FIG. 3, extends into the path of receptacle 12 on rotating container 9. Stop means 17 is located such that it effects placement of container 9 with receptacle 12 in proper alignment for handle attachment via die assembly 22.

Figure 2:
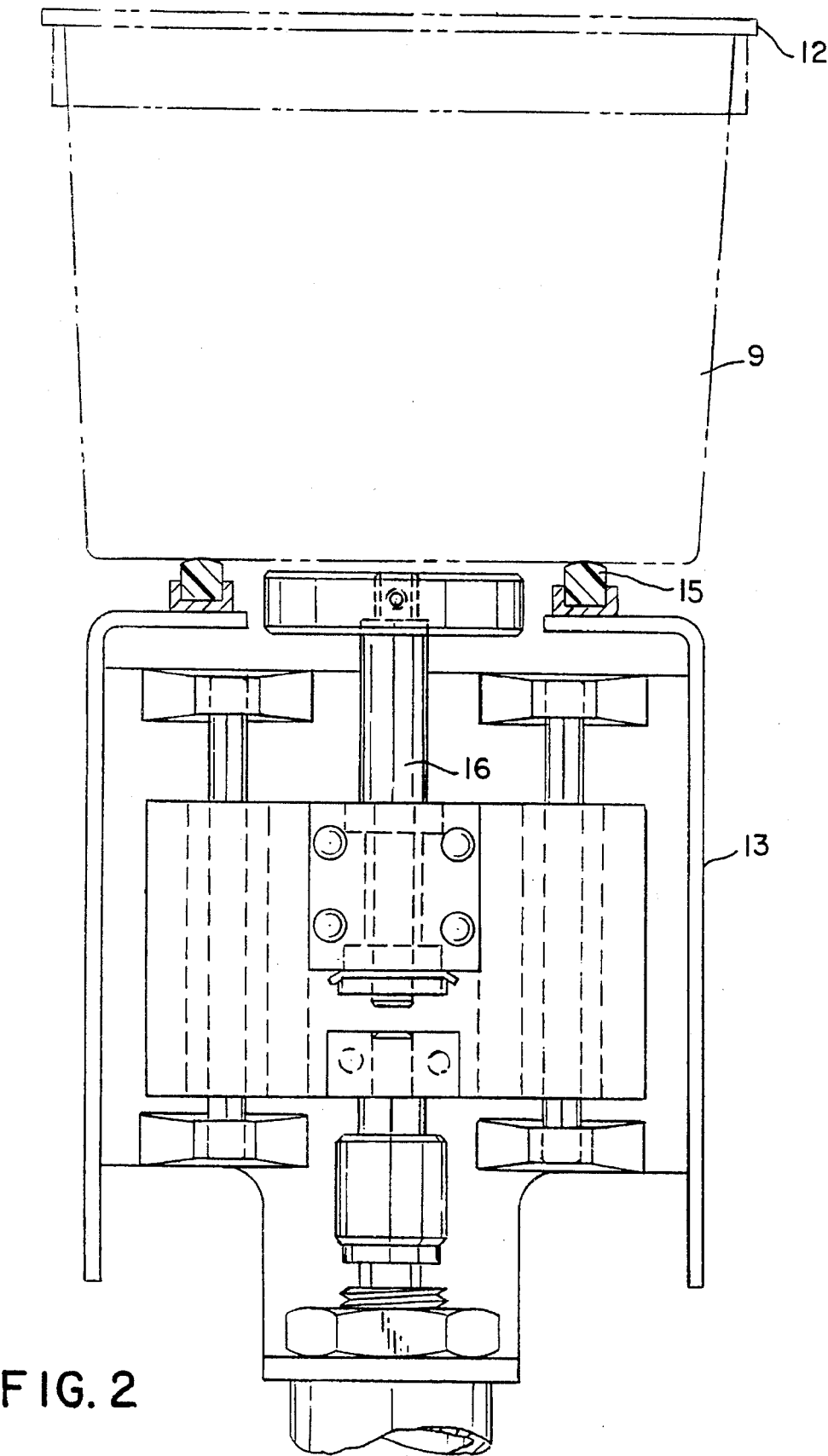
FIG. 2 is an elevational view of the pop-up assembly.

The pop-up assembly of the current invention is shown in FIG. 2. Pop-up assembly 13, accepts container 9 from a conveyor belt (not shown). Container 9 rests on support ring 15. Pop-up assembly member 16 elevates container 9 into a mated position with the mandrel of FIG. 1. Preferably, member 16 is pneumatically driven and only travels a short distance to place container 9 into alignment with mandrel 5. More preferably, pop-up assembly 16 will travel less than one inch to mate rim 19 of container 9 with mandrel 5.

FIG. 4 displays one half of a die assembly. The half not shown is substantially identical. First die member 21a is pneumatically driven via shaft 23. The die assembly is comprised of a top moveable first die member 21a and a bottom fixed second die member 21b. First member 21a in combination with second die member 21b curve handle 25 into the desired shape, aligning protuberance 27 with receptacle 12 on container 9. Preferably, second die member 21b is pneumatically driven forward to receive the handle from feed mechanism 40 of FIGS. 6 and 7. A gripper mechanism (not shown) holds the handle against die member 21b while die member 21b in cooperation with die member 21a aligns protuberance 27 below receptacle 12. Thereafter, the die assembly 22 is raised by a pneumatic snap cylinder (not shown) lifting handle 25 upward and protuberances 27 into an interlocking relationship with the locking hole of receptacle 12.

Figure 5:
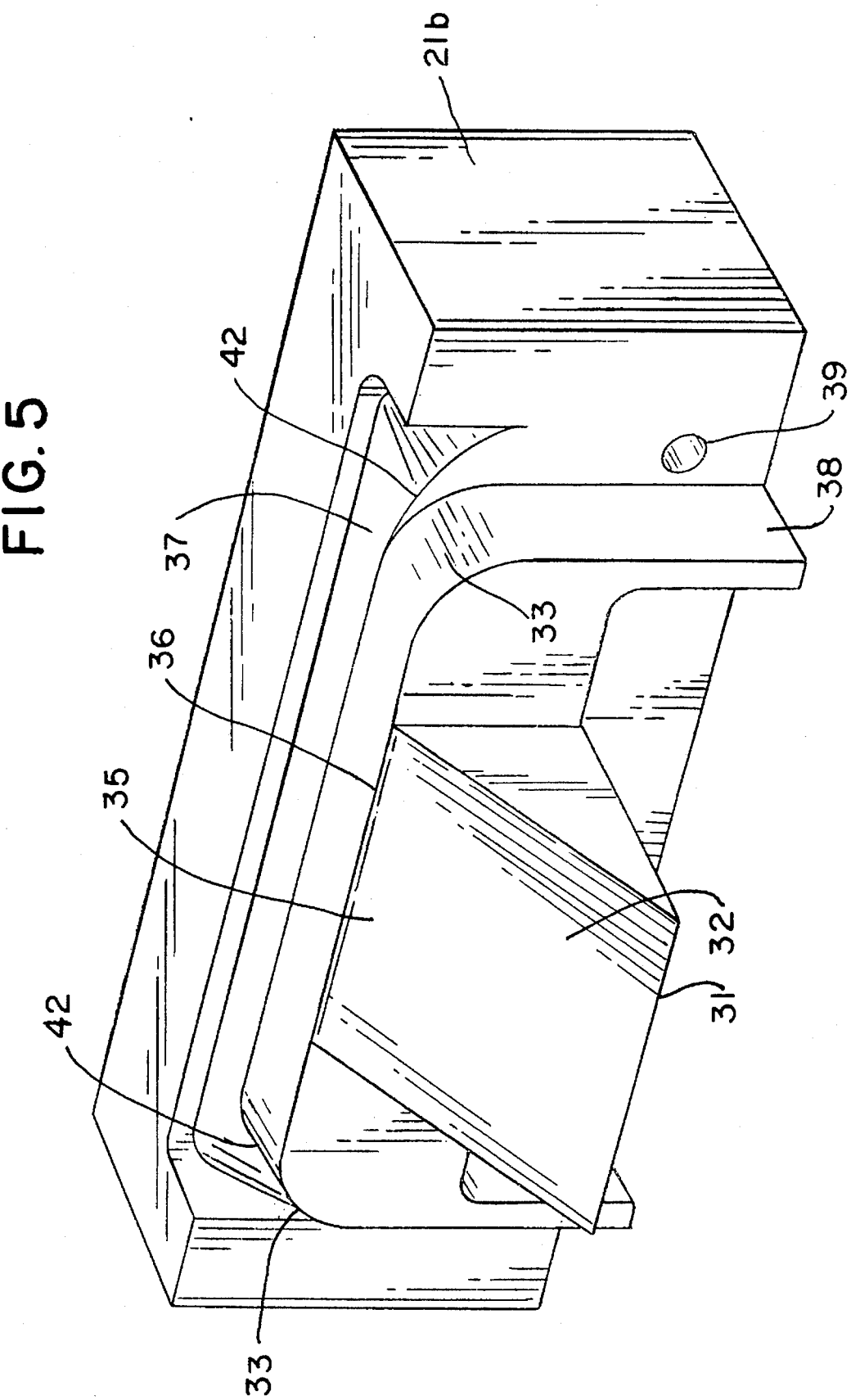
FIG. 5 is a perspective view of the die mechanism.

FIG. 5 displays a preferred second die member 21b. Second die member 21b is comprised of guide 31 with angled portion 32 located adjacent a central portion 35 of handle forming surface 36. Central position 35 provides an area against which the handle is gripped. Handle forming surface 36 further comprises arcuate shaped portions 33 contiguous with each end of central portion 35 and terminal portions 38. Relief shoulder 37 is adjacent the central portion 35. Shoulder 37 includes tapered edges 42 at its side adjacent handle forming surface 36. Preferably, the tapered edges 40 are at the ends of shoulder 37. Tapered edges 40 function to urge the handle ends into proper alignment during forming. Bore 39 accommodates a rod (not shown) which can be driven through bore 39 to disengage a handle from handle forming surface 36.

FIGS. 6 and 7 demonstrate handle feed mechanism 40. A two belt conveyor 41 is rotated above platform 43. Handles 25 are positioned between platform 43 and conveyor belts 41. Rotation of conveyor belts 41 result in a plurality of fingers 45 contacting handle 25 and sliding handle 25 along platform 43 towards second die member 21b. At the terminal portion of belts 41 and platform 43, handle 25 enters slots 47 in rotatable members 49. Rotation of members 49 presents handle 25 to second die member 21b. Feed mechanism 40 also includes guides 51 and 53 to align handles 25. Rods 55 act in concert with protuberances 27 to further maintain alignment of handles 25.

This description is generally directed to a container and handle assembled via receptacle and protuberance arrangement. However, it should be apparent to one of ordinary skill in the art that the current apparatus could employ a button and hook arrangement or any other suitable interlocking means known in the art.

Thus it is apparent that there has been provided, in accordance with the invention, an apparatus for attaching handles to a container that fully satisfies the objects, aims, and advantages set forth. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

Having thus described the invention, it is claimed:

1. An apparatus for attaching a plastic handle having first and second ends to a plastic container having an opening and first and second receptacles comprising:

(a) a mandrel comprised of a top, a bottom and a tapered side portion, said tapered side portion adjacent said top having a diameter at least as great as a diameter of said container opening and said tapered side portion adjacent said bottom having a diameter less than said container opening;

(b) a means for placing said container in a mated position with said tapered side portion of said mandrel received internally of said container; and (c) a means for attaching said first and second handle ends to said first and second container receptacles while said container is mated with said mandrel.

2. The apparatus of claim 1 wherein attaching said first end of said handle to said first receptacle on said container causes said container to slide upwardly on said mandrel side portion at a side of said container adjacent said first receptacle and slide downwardly on said mandrel side portion at a side of said container adjacent said second receptacle facilitating mating of said second end of said handle with said second receptacle.

3. The apparatus of claim 1 further comprising a means to elevate said container into a mated relationship with said mandrel.

4. The apparatus of claim 3 comprising a pneumatically driven member.

5. The apparatus of claim 1 wherein said mandrel is rotatable.

6. The apparatus of claim 5 further comprising a means to stop rotation of said container on said mandrel.

7. The apparatus of claim 6 further comprising a member intersecting a rotational path of at least one of said receptacles on said container.

8. The apparatus of claim 1 wherein said means for attaching said handle comprises a die.

9. The apparatus of claim 1 wherein said means for attaching comprises a die assembly forming said handle into an arcuate shape.

10. The apparatus of claim 1 wherein said side portion is shaped concentrically to a shape of said container opening.

* * * * *